United States Patent
Kim

(10) Patent No.: US 7,433,499 B2
(45) Date of Patent: Oct. 7, 2008

(54) METHOD AND APPARATUS FOR CAPTURING AND AUTHENTICATING BIOMETRIC INFORMATION FROM A WRITING INSTRUMENT

(75) Inventor: Richard C. Kim, Scottsdale, AZ (US)

(73) Assignee: DynaSig Corporation, Tempe, AZ (US)

( * ) Notice: Subject to any disclaimer, the term of this patent is extended or adjusted under 35 U.S.C. 154(b) by 768 days.

(21) Appl. No.: 10/924,301

(22) Filed: Aug. 23, 2004

(65) Prior Publication Data

US 2005/0063570 A1     Mar. 24, 2005

Related U.S. Application Data

(60) Provisional application No. 60/497,145, filed on Aug. 22, 2003.

(51) Int. Cl.
*G06K 9/00* (2006.01)
*G06K 9/22* (2006.01)

(52) U.S. Cl. .................... 382/119; 382/313
(58) Field of Classification Search ............ 382/116, 382/119
See application file for complete search history.

(56) References Cited

U.S. PATENT DOCUMENTS

| | | | |
|---|---|---|---|
| 4,513,437 A | 4/1985 | Chainer et al. | |
| 5,018,208 A | 5/1991 | Gladstone | |
| 5,517,579 A | 5/1996 | Baron et al. | |
| 5,559,895 A | 9/1996 | Lee et al. | |
| 5,719,691 A * | 2/1998 | Curtis et al. | 359/11 |
| 5,774,571 A | 6/1998 | Marshall | |
| 6,236,740 B1 | 5/2001 | Lee | |
| 6,307,956 B1 * | 10/2001 | Black | 382/124 |
| 6,393,138 B1 | 5/2002 | Chai | |
| 6,487,310 B1 | 11/2002 | Bishop et al. | |
| 6,539,101 B1 | 3/2003 | Black | |
| 6,563,939 B1 | 5/2003 | Chai | |
| 2001/0055411 A1 | 12/2001 | Black | |
| 2002/0028017 A1 | 3/2002 | Munich et al. | |
| 2003/0044050 A1 | 3/2003 | Clark et al. | |

* cited by examiner

*Primary Examiner*—Jingge Wu
*Assistant Examiner*—Hadi Akhavannik
(74) *Attorney, Agent, or Firm*—DuBois, Bryant & Campbell LLP; William S. Wiese

(57) ABSTRACT

This present invention includes a method for capturing and transmitting data captured from a writing instrument in a secure manner. More specifically, the biometric information collected from the pen is coupled with at least one additional data point for encryption. The user initially uses the pen to create a signature which is converted into an encrypted reference value in accordance with the present invention. When authentication is desired, the user uses the same or similar pen to create a signature which again is converted into an encrypted data value. Thereafter, the encrypted reference value is compared to the encrypted data value to determine if the values substantially match. There is not need to retain the original reference signature, thereby enhancing the security of the overall system.

15 Claims, 3 Drawing Sheets

METHOD AND APPARATUS FOR CAPTURING AND AUTHENTICATING BIOMETRIC INFORMATION FROM A WRITING INSTRUMENT

CROSS-REFERENCE TO RELATED APPLICATIONS

This patent application claims the benefit of priority from U.S. Provisional Patent Application Ser. No. 60/497,145 filed on Aug. 22, 2003. This application incorporates by reference the entire disclosure of U.S. Provisional Patent Application Ser. No. 60/497,145.

FIELD OF THE INVENTION

This invention relates to the automated capture and authentication of biometric information, more particularly to a more cost effective biometric pen with improved security features.

BACKGROUND OF THE INVENTION

Many user identification systems are known in the art. The most common method for user identification in typical computer applications is through the use of a user identification and password, often alpha-numeric strings used to verify the user. In other approaches, various methods are employed for storing image or password information in a magnetic stripe or in an optically encoded image or pattern, which is physically part of the identification card. Still other approaches utilize a "smart card" having, for example, its own semiconductor memory capability for information storage.

More elaborate schemes take advantage of the user's unique physical features such as fingerprints, facial features and retinal scan data. Once these features are digitized as an image, the processed data is stored for reference at a later time. When the user logs into the system, then the reference data is compared to the input to determine the similarities.

More recently, there have been developments in the field of automatic signature verification. In the early stages, systems were disclosed which made the concept of personal identification via computer-based signature practical. Subsequently, a number of patents disclosed systems whereby the use of acceleration and pressure data from a person's unique signature dynamics were compared to verify the user's identify. Following are examples of such patents in the prior art.

U.S. Pat. No. 4,513,437 of Chainer, et. al. entitled "Data Input Pen for Signature Verification," discloses a special structure within the pen for detecting acceleration forces involving variable capacitance transducers and does not disclose nor suggest a cost-effective pen apparatus or a secure method of maintaining the signature data.

U.S. Pat. No. 5,018,208 of Gladstone entitled "Input Device for Dynamic Signature Verification Systems," discloses a pen with barrel pressure transducers for sensing radially-inward-directed finger pressure against the barrel. However, the patent does not suggest or disclose a cost-effective pen apparatus or a secure method of maintaining the signature data.

U.S. Pat. No. 5,517,579 of Baron, et. al, entitled "Handwriting Input Apparatus for Handwriting Recognition using More Than One Sensing Technique," discloses a handwriting recognition apparatus employing at least two different sensing techniques and a method by which each handwritten symbol may be recognized using a per-person, per-symbol database. Once again, the patent does not disclose a cost-effective pen apparatus or a secure method of maintaining the signature data.

U.S. Pat. No. 5,774,571 of Marshal entitled "Writing Instrument with Multiple Sensors for Biometric Verification," discloses an apparatus with a grip sensor that senses the grip pressure pattern of the user and compares those patterns against known patterns. The grip sensor precludes the device from being cost-effective and the patent does not discuss or disclose the security of the data.

U.S. Pat. No. 6,236,740 of Lee entitled "Signature Verification Apparatus and Method Utilizing Relative Angle Measurements," discloses an apparatus and method for verifying a signature by generating a string of identification digits in a document, writing those identification digits with a data input stylus and verifying the identification digits according to the relative angle of the data input stylus. The patent discloses one method of adding security to the data but does not provide for a cost-effective writing instrument.

U.S. Pat. No. 6,539,101 of Black entitled "Method for Identity Verification," discloses a verification method whereby the user grasps a writing stylus that captures a fingerprint image and compares that image against a known image. Once again, the finger-print gathering apparatus on the barrel of the pen makes the device cost-prohibitive and there is no method disclosed for preserving the security of the data.

As can be seen from the foregoing, the configuration of each of the devices causes them to be considerably more costly than a conventional writing instrument. In addition, another significant problem is that both the input data and the reference data can be easily stolen and used by unauthorized parties. Therefore, a need remains for a cost-effective writing device that is capable of providing secure biometric information for verification.

SUMMARY OF THE INVENTION

This present invention includes a method for capturing and transmitting data captured from a writing instrument in a secure manner. More specifically, the biometric information collected from the pen is coupled with at least one additional data point for encryption. The user initially uses the pen to create a signature which is converted into an encrypted reference value in accordance with the present invention and stored for later use. When authentication is desired, the user uses the same or similar pen to create a signature which again is converted into an encrypted data value. Thereafter, the encrypted reference value is compared to the encrypted data value to determine if the values substantially match. There is not need to retain the original reference signature, thereby enhancing the security of the overall system.

This invention, together with the additional features and advantages thereof will become more apparent to those of skill in the art upon reading the description of the preferred embodiments, with reference to the following drawings.

DESCRIPTION OF THE DRAWINGS

A better understanding of the system and method of the present invention may be had by reference to the drawing figures, wherein.

DESCRIPTION OF THE PREFERRED EMBODIMENTS

The present invention is an improved device for verifying the identity of the user. As used herein unless the context indicates otherwise, a "pen" is any device that is compatible with either the hand or finger of the user for purposes of making a notation. While the drawings depict a conventional shape of a pen, other shapes and designs are also included within the scope of the present invention such as any attachment to a finger or any implement that can be held with a hand for such purpose. It will be understood by one skilled in the art that it is not necessary to use precisely the same type of pen as hereinafter described, or even to have an actual mark made at all. In fact, for certain secrecy applications the latter might be desired. For convenience of reference in the subsequent description, the overall apparatus will simply be referred to as a pen.

Also as used herein unless the context indicates otherwise, "biometric information" means information relating to the characteristics of the user when using the pen such as, for example, the angle at which the pen is tilted, the pressure applied by the pen to the writing surface, the speed at which the signature is written and other such characteristics. For convenience of reference in the subsequent description, the overall collection of information will simply be referred to as biometric information.

The pen 102 of the present invention has numerous uses, and primarily for purposes of illustration, include signature verification at POS terminals, pen-based computers user identification, and to provide improved convenience to guests within various controlled environments. It should be appreciated that the present invention may be used in a number of different applications and in a number of different industries.

Figure 1:
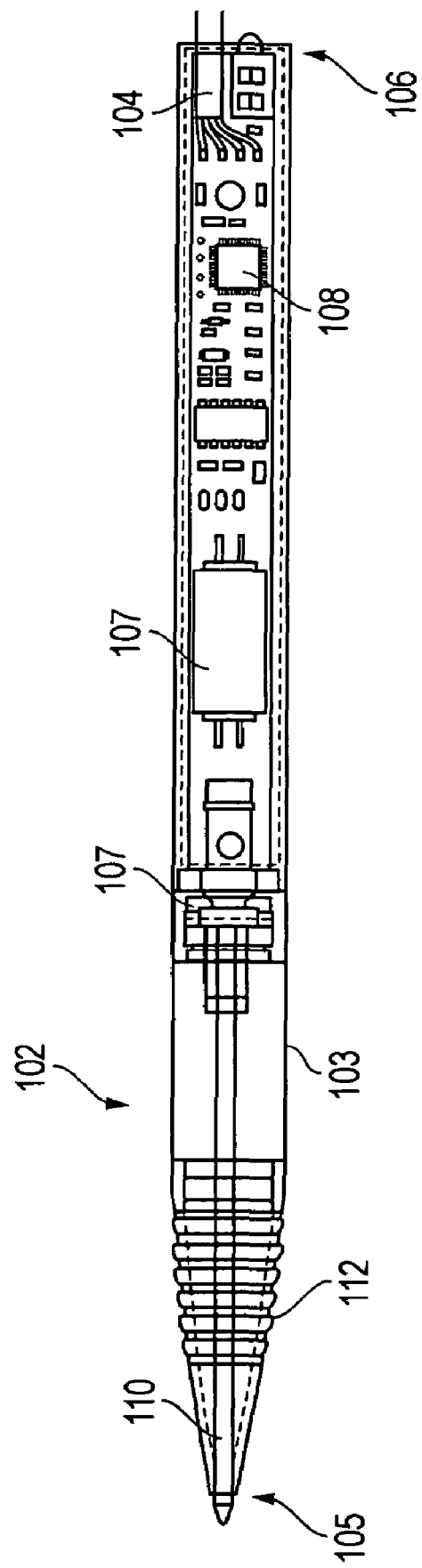
FIG. 1 shows a top view with the outer casing partly broken away of the pen incorporating the features of the present invention.

Referring now to the various figures of the drawing wherein like reference characters refer to like parts throughout the several views. FIG. 1 is a top view with the outer casing partly broken away of the pen incorporating the features of the present invention.

In FIG. 1, the overall structure of the pen 102 includes an outer casing 103 constructed of a rigid or semi-rigid material such as plastic, metal, or the like. The outer casing 103 is preferably tubular, however the cross-section of the tube may be circular, triangular or other configurations which may improve the comfort of the grip or the functionality of the device. In addition, the outer casing 103 may be constructed of a conductive material so as to shield the circuitry inside the casing 103 from electromagnetic noise.

The distal end 106 of the pen 102 may be adapted to receive a connector 104, which connects the pen to a data acquisition device. The connector may be a USB cable, a firewire cable or any other connection to a data acquisition device, including a wireless connection as will be discussed later. Alternatively, the pen 102 may be configured with a socket capable of accommodating a connector 104 so that the user may carry the pen 102 with them and connect it to the connector 104 only when necessary. The circuit board is coupled with certain electronics, such as motion sensors 107, used in capturing data. Adjacent to the connector 104 at the distal end 106 of the pen 102 is a circuit board containing, among other things, a micro-controller 108. The micro-controller 108 serves a number of functions relative to data security which will be discussed later. First, it identifies each ball point cartridge 110 as a unique cartridge. Second, it collects data from the sensors 107 and communicates the data through the connector 104 to the data acquisition device. Third, it provides a time stamp of the time and date the data was collected from the sensors 107 and encrypts the identity of the cartridge 110, the data and the time stamp so as to create a unique and highly secure set of test data.

A removable grip 112 is located at the proximal end 105 of the pen 102. The removable grip 112 may be any removable grip commonly found at office supply outlets. Alternatively, the removable grip 112 may be specially constructed of any material such as plastic, rubber or the like and may be constructed of a material and in a configuration to maximize the user's comfort. If the removable grip 112 becomes soiled or worn, it may be removed and replaced with a new one.

Also at the proximal end 105 of the pen 102 is a standard ball point cartridge 110 which is coupled with the casing 103 by threads, a snap-in mechanism or the like. More specifically, the casing 103 is configured to accept cartridges 110 such as those that are commonly found at an office supply outlet. If the pen 102 runs out of ink, a new cartridge 110 may be substituted. Additionally, the cartridge 110 can be made of a plastic stylus or other custom tip as applications may require. In addition, the overall pen structure has been embodied in a device substantially the same size as a conventional ball point pen so that the user may grip and write with the pen 102 in any manner the user desires. This is important because the user is not required to hold the pen 102 in a certain way in order to properly record data. While the "stylus" type devices known in the prior art do not require the user to hold the pen in a certain way, these devices are used with electronic pads or tablets. Typical pen-type devices known in the prior art that do not require writing pads or tablets require the pen to be gripped in a specific configuration in order to properly collect data.

Figure 3:
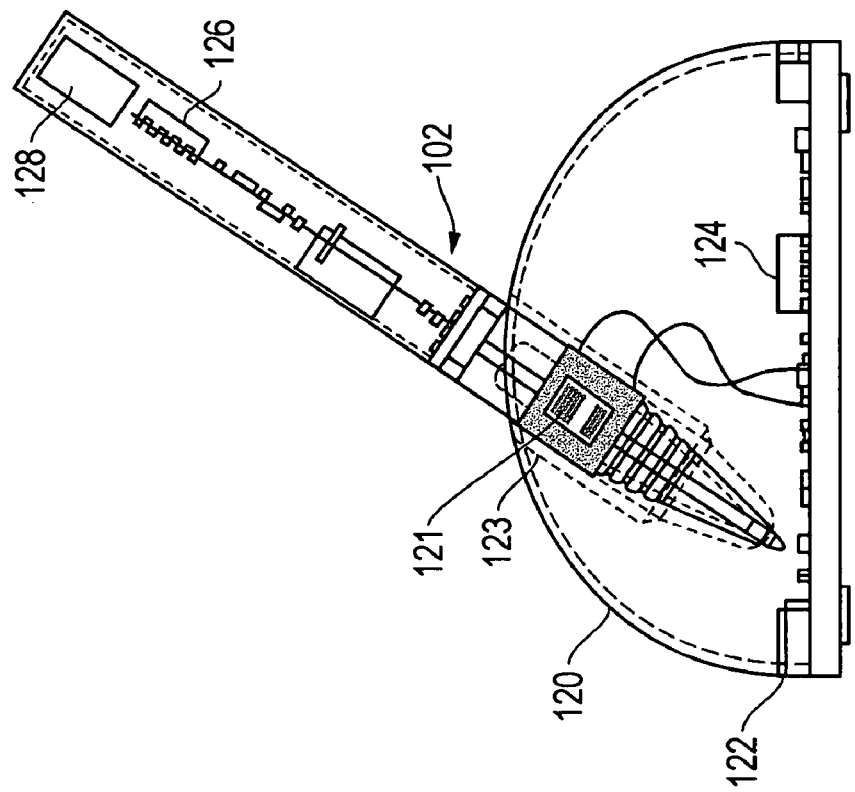
FIG. 3 shows a side view of the same alternative embodiment of the pen in cross-section.
Figure 2:
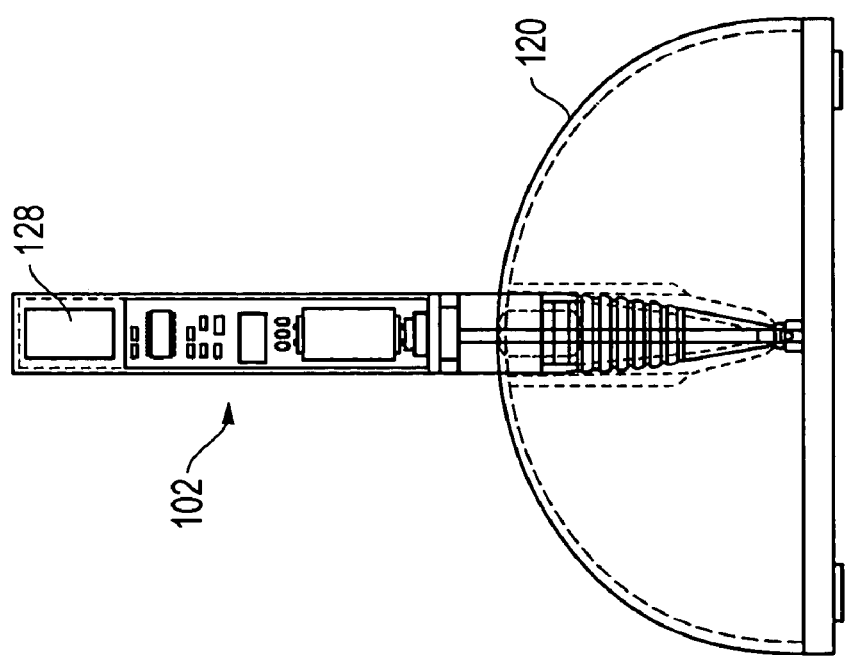
FIG. 2 shows a frontal view of an alternative embodiment of the pen in cross-section.

FIG. 2 and FIG. 3 show front and lateral views, respectively, of a pen 102 of the present invention in a charging cradle 120. In this configuration, the pen 102 is shown without a connector 104 attached. Instead, the pen 102 is configured with a radio frequency, or RF, transmitter 126 capable of transmitting data from the pen 102 to the RF receiver 124 located in the charging cradle 120. The absence of the connector 104 makes characteristics of the pen 102 substantially more similar to a standard ball point pen and, therefore, should provide more reliable data for comparison. Because the RF transmitter 126 will need power transmit the signal to the RF receiver 124, the pen 102 is configured with a rechargeable battery 128. The rechargeable battery 128 can be recharged when in the charging cradle 120 using, for example, induction charging. By using an inductive transfer coil 123 in the charging cradle 120 and an embedded inductive charging coil 121 inside the pen, the pen outer casing will not have any exposed connectors for charging. This causes the pen to look and feel like a normal pen when writing and the user does not need to be concerned about touching electrical contacts when using the pen.

The identity verification system of the present invention can be used in a variety of applications requiring identity verification. Examples of applications for the present invention include law enforcement; voter registration and confirmation; drivers' license registration and verification; and credit card verification. In a typical application, a sample signature is recorded for reference purposes at a time that the identity of the user can be verified. The reference signature is then stored for comparison at a later time.

At such time as the user desires to be authenticated, the user can use the pen 102 to sign in the same manner as when the user signed the reference signature. It is important to note that the "signature" need not be the person's name but may be a password or secret word or phrase known only to the user. In addition, it is not necessary for the user to actually "write"

anything in the sense that the user is making a marking on paper. The user could simply make a motion in the air. The system will then match the signature to be authenticated with the reference signature to determine if the user is authenticated.

Figure 4:
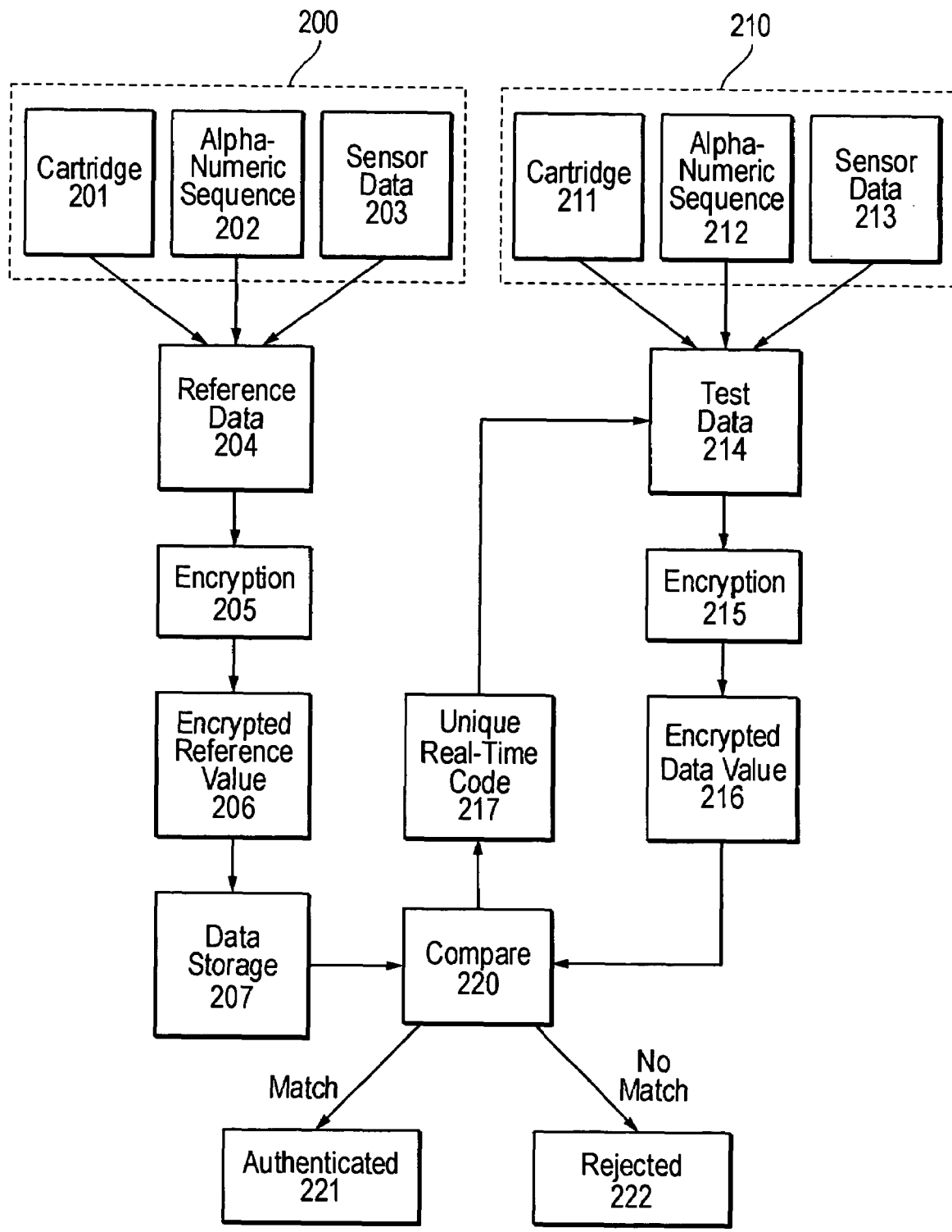
FIG. 4 is a flow diagram showing certain security features of the present invention.

As can be seen from FIG. 4, the security of the data transmitted for verification is one aspect of the present invention. First, biometric information 200 is collected from a number of different sources. Data 201 is collected from sensing the force and movement of the cartridge 110. As described above, the fact that the cartridge 110 and the replaceable grip 112 can be easily substituted allows the user to use the pen in any way the user desires. Accordingly, all users in a common environment may use a common pen or each user can use a different pen 102, in which case the cartridge and pen sensors can be associated with that user's signature. In this way, a pen may be used by a number of different users in a common environment or, for greater security, by a single user.

Biometric information 200 is also collected in the form of the alpha-numeric sequence generated 202. The user can use his or her name or any variant thereof (e.g. John Quincy Smith, John Q. Smith, J. Q. Smith, etc.) or any alpha-numeric string (e.g. Mickey mouse, July eleventh, etc.) as the user's "signature." In addition, biometric information is collected from the motion sensors 203 within the pen 102 when the reference signature is created. It is important to recognize that conventional biometric writing authentication systems only collect and compare data from the sensors for comparison.

The data is aggregated to form a complete set of reference data 204 which is then encrypted 205 to create the encrypted reference data 206. This reference data can be used immediately or can be stored in a normal medium 207 such as a server hard-drive, magnetic strip of smart-card for later use. The encryption processing method involves the phase preservation and reconstruction method similar to holographic recordings. Both the amplitude and phase of the pen movement are recorded. Once this information is digitized, the reference strokes (such as signature, ID phrase or password) are then correlated with the object signal form (created by the verifying entity such as banks or any organization providing the service). Once these two signals are multiplied (in complex domain), then the resulting data will be a "digital hologram" of the signature (i.e. multiplication of two waveforms with complex amplitude and phase preserved). This digital hologram can be easily stored and copied. However, it is not useful for anything until it is "de-convoluted" in the complex domain (multiplied in the Fourier frequency domain) with the original phase of the input device.

At the time the user desires to be authenticated, new biometric data 210 is collected, including data from the cartridge 211, data regarding the alpha-numeric sequence 212, and data from the motion sensors 213. As an additional security measure, the comparison algorithm has an option to produce a unique real-time security code 217 to be used in the generation and encryption of test data. The security code 217 would be used only once. It is important to realize that the design of the pen 102 allows two-way communication between the pen and the data acquisition device. The complete set of test data 214 is then encrypted 215 using the same process as described above for the reference data to form an encrypted set of test data 216. The encrypted test data 216 is compared to the encrypted reference data 206. If the two data sets match, the user is authenticated 221. If the two data sets do not match, the user is rejected 222.

It is important to recognize that, after the reference sample is collected, the actual writing may be discarded because the reference sample itself is not matched with the test sample. If we were to simply store the reference signature and compare the test signature with the reference signature, one could easily copy the reference signature and match that signature when authentication is desired. However, in the present invention, the encrypted version of the reference signature, one that contains much more data than just the signature itself, is compared to the encrypted version of the test signature, again containing much more information than just the signature itself.

Because the reference data is an encrypted combination of a multiplicity of data, it serves no purpose other than as a verification key. Even if the server upon which the encrypted reference data resided was stolen, the thief would be unable to re-create a signature from the data because the encrypted reference data includes variables unknown to the thief. The thief would need to be able to recreate the phase, both speed and angle, at the time of the test data in order for the system to decrypt the lock. Simply recreating a perfect signature match with all the proper pen strokes will not suffice.

While the present system and method has been disclosed according to the preferred embodiment of the invention, those of ordinary skill in the art will understand that other embodiments have also been enabled. Such other embodiments shall fall within the scope and meaning of the appended claims.

What is claimed is:

1. A method for capturing and verifying biometric information, comprising: writing a reference signature using a pen, said pen being configured to record and digitize two or more forms of biometric information; encrypting said biometric information to create an encrypted reference value; writing a signature to be verified using a pen, said pen also configured to record and digitize two or more forms of biometric information; encrypting said biometric information from said signature to be verified to create an encrypted data value; and comparing said encrypted reference value with said encrypted data value to determine if the values substantially match.

2. The method of claim 1, wherein said pen is a device that is compatible with either the hand or finger of the user for purposes of making a notation.

3. The method of claim 1, wherein said pen does not leave a mark when said reference signature or said signature for verification are collected.

4. The method of claim 1, wherein one or more forms of biometric information are selected from the group consisting of the angle at which the pen is tilted, the pressure applied by the pen to the writing surface, the speed at which the signature is written, the identity of the pen, the alpha-numeric sequence being written by the pen and the time or date at which the signature was written.

5. The method of claim 1, wherein the method used to encrypt said biometric information is a phase preservation and reconstruction method.

6. The method of claim 1, wherein said pen used to create the reference signature and said pen used to create the signature to be verified are the same pen.

7. The method of claim 1, wherein a cartridge in the pen used to create the reference signature is specifically identified for use by an individual user.

8. The method of claim 1, wherein a transaction is approved if the encrypted reference value matches the encrypted data value.

9. A method for capturing and verifying biometric information, comprising: obtaining a reference signature through the use of a pen, said pen capable of recording and digitizing two or more forms of biometric information; encrypting said digitized biometric information to create an encrypted reference value; obtaining a signature to be verified through the use of a pen, said pen capable of recording and digitizing two or more forms of biometric information; encrypting said digitized biometric information of said signature to be verified to create a encrypted data value; and comparing said encrypted reference value with said encrypted reference value to determine if the values substantially match.

10. The method of claim 9, wherein said pen is a device that is compatible with either the hand or finger of the user for purposes of making a notation.

11. The method of claim 9, wherein said pen does not leave a mark when said reference signature or said signature for verification are collected.

12. The method of claim 9, wherein one or more forms of biometric information are selected from the group consisting of the angle at which the pen is tilted, the pressure applied by the pen to the writing surface, the speed at which the signature is written, the identity of the pen, the alpha-numeric sequence being written by the pen and the time or date at which the signature was written.

13. The method of claim 9, wherein the method used to encrypt said biometric information is a phase preservation and reconstruction method.

14. The method of claim 9, wherein said pen used to create the reference signature and said pen used to create the signature to be verified are the same pen.

15. The method of claim 9, wherein a cartridge in the pen used to create the reference signature is specifically identified for use by an individual user.

\* \* \* \* \*